(12) United States Patent
Imanaka (10) Patent No.: US 8,142,942 B2
(45) Date of Patent: Mar. 27, 2012

(54) VAPORIZER AND POWER GENERATION APPARATUS AND ELECTRONIC EQUIPMENT IN WHICH VAPORIZER IS PROVIDED

(75) Inventor: Daisuke Imanaka, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 964 days.

(21) Appl. No.: 12/134,272

(22) Filed: Jun. 6, 2008

(65) Prior Publication Data

US 2008/0305373 A1  Dec. 11, 2008

(30) Foreign Application Priority Data

Jun. 8, 2007  (JP) ................................. 2007-152899

(51) Int. Cl.
  *H01M 8/06* (2006.01)
(52) U.S. Cl. ...................................................... 429/423
(58) Field of Classification Search .................. 429/423, 429/433, 440
  See application file for complete search history.

(56) References Cited

U.S. PATENT DOCUMENTS

2002/0001741 A1* 1/2002 Kawasumi et al. ............. 429/20

FOREIGN PATENT DOCUMENTS

JP  2001-338665 A  12/2001

* cited by examiner

*Primary Examiner* — Javaid Nasri
(74) *Attorney, Agent, or Firm* — Holtz, Holtz, Goodman & Chick, PC (57) ABSTRACT

Disclosed in a vaporizer including a gas-liquid separation film which separates a gas included in a supplied liquid and which allows the separated gas to pass through the gas-liquid separation film and a heating unit which is provided at a downstream side of the gas-liquid separation film and which heats the liquid.

21 Claims, 6 Drawing Sheets

VAPORIZER AND POWER GENERATION APPARATUS AND ELECTRONIC EQUIPMENT IN WHICH VAPORIZER IS PROVIDED

CROSS-REFERENCE TO RELATED APPLICATIONS

This application is based upon and claims the benefit of priority under 35 USC 119 of Japanese Patent Application No. 2007-152899 filed on Jun. 8, 2007, the entire disclosure of which, including the description, claims, drawings, and abstract, is incorporated herein by reference in its entirety.

BACKGROUND OF THE INVENTION

1. Field of the Invention

The present invention relates to a vaporizer which vaporizes a liquid by heating and to a power generation apparatus and an electronic equipment in which the vaporizer is provided.

2. Description of the Related Art

For example, in the power generation apparatuses, there is a fuel cell apparatus which comprises a power generation cell which generates electricity by an electrochemical reaction between a fuel such as methanol, ethanol, dimethyl ether and the like and oxygen. In the fuel cell apparatus, a vaporizer which vaporizes the liquid fuel and water by heating is provided as disclosed in JP2001-338665, for example. As for a vaporizer, for example, there is known a vaporizer comprising a porous material in which a liquid to be vaporized flows therein and a heater to heat the porous material.

However, in such a vaporizer, when the bubbles get into the piping at the upper stream side of the vaporizer, the bubbles remain in the upper stream side of the porous material because bubbles cannot infiltrate into the porous material easily comparing to the liquid fuel and water. Therefore, the liquid fuel and water cannot be supplied stably to the vaporizer, and thus, the fuel cannot be supplied stably to the power generation cell either.

SUMMARY OF THE INVENTION

The vaporizer of the present invention includes a gas-liquid separation film which separates a gas which is included in a supplied liquid and which allows the gas which is separated to pass through the gas-liquid separation film and a heating unit which is provided at a downstream side of the gas-liquid separation film and which heats the liquid.

Further, the power generation apparatus of the present invention includes a vaporizer to vaporize a supplied liquid fuel, a reaction device to generate a reformed gas by a reaction of a gas which is generated by the vaporizer and a power generation cell to generate an electricity by a reaction of the reformed gas, and the vaporizer includes a gas-liquid separation film which separates a gas which is included in the supplied liquid fuel and which allows the gas which is separated to pass through the gas-liquid separation film and a heating unit which is provided at a downstream side of the gas-liquid separation film and which heats the liquid fuel.

Furthermore, the electronic equipment of the present invention includes a power generation apparatus to generate an electricity by a reaction of a liquid fuel and an electronic equipment main body which operates by an electricity which is generated by the power generation apparatus, and the power generation apparatus includes a vaporizer to vaporize a supplied liquid fuel, a reaction device to generate a reformed gas by a reaction of a gas which is generated by the vaporizer and a power generation cell to generate an electricity by a reaction of the reformed gas, and the vaporizer includes a gas-liquid separation film which separates a gas which is included in the supplied liquid fuel and which allows the gas which is separated to pass through the gas-liquid separation film and a heating unit which is provided at a downstream side of the gas-liquid separation film and which heats the liquid fuel.

BRIEF DESCRIPTION OF THE DRAWINGS

The present invention will sufficiently be understood by the following detailed description and accompanying drawing, but they are provided for illustration only, and not for limiting the scope of the invention.

DETAILED DESCRIPTION OF THE EMBODIMENT

Embodiments of the present invention will be explained with reference to the drawings.

First Embodiment

[Electronic Equipment]

Figure 1:
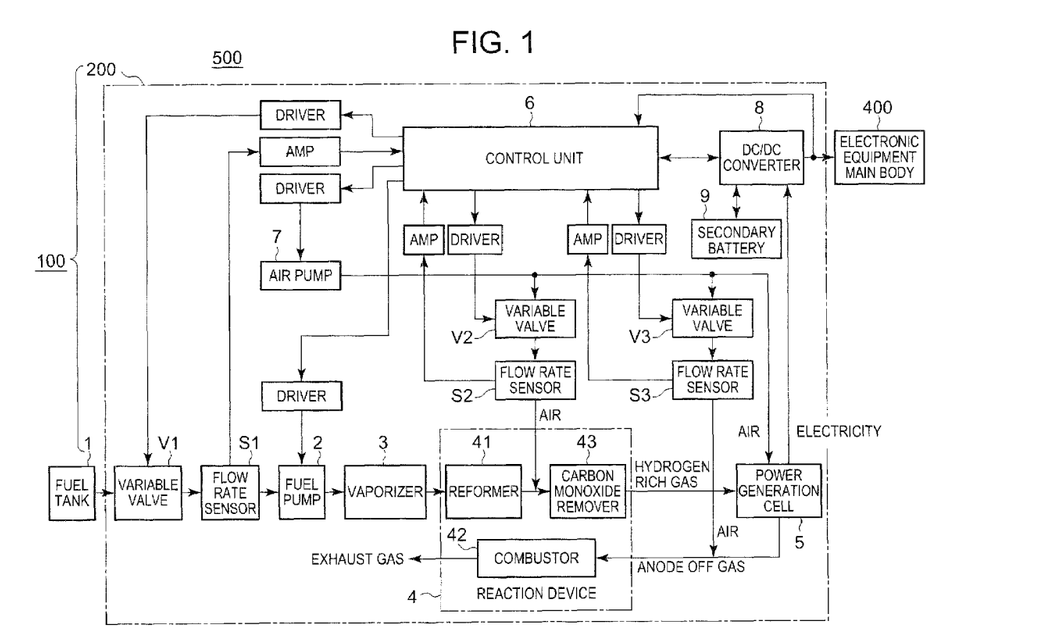
FIG. 1 is a block diagram showing a basic structure of the electronic equipment 500 according to the first embodiment.

FIG. 1 is a block diagram showing a basic structure of the electronic equipment 500.

The electronic equipment 500 is configured with the electronic equipment main body 400 and the power generation apparatus 100. The power generation apparatus 100 comprises a fuel tank 1 to store liquid fuel and water and a power generation unit 200 to generate electricity from the liquid fuel and water which are supplied from the fuel tank 1. The power generation unit 200 comprises a fuel pump (supply unit) 2 to supply liquid fuel and water to the vaporizer 3 from the fuel tank 1, the vaporizer 3 to generate a gas mixture of liquid fuel and moisture by vaporizing the liquid fuel and water which are supplied from the fuel tank 1, the reaction device 4 to generate a fuel gas from the gas mixture of the fuel and moisture which is generated in the vaporizer 3, the power generation cell 5 to generate electricity by using the fuel gas generated in the reaction device 4 and the air pump 7 which takes in air from outside of the power generation apparatus 100 and sends the air to the after mentioned carbon monoxide remover 43, the combustor 42 and the power generation cell 5 of the reaction device 4. Although the detail will be described later, the power generation device 100 further comprises the DC/DC converter 8, the secondary battery 9 and the control unit 6 to control each unit of the power generation device 100. The electricity which is generated in the power generation device 100 is supplied to the electronic equipment main body 400 via the DC/DC converter.

As for the liquid fuel, for example, alcohols such as methanol, ethanol and the like, ethers such as dimethyl ether and the like and a compound including hydrogen atom such as gasoline can be used. Methanol is used in the embodiment described hereinafter.

A variable valve (supply unit) V1 and the flow rate sensor S1 are provided between the fuel tank 1 and the fuel pump 2 in order from the upper stream side. The flow rate sensor S1 detects the flow rate of the liquid mixture of the liquid fuel and water and outputs an electric signal, and the outputted signal is amplified by the amplifier AMP and is sent to the control unit 6. The control unit 6 controls the variable valve V1 based on the signal and the flow rate of the liquid mixture is changed. The variable valve (supply unit) V2, V3 and the flow rate sensor S2, S3 are respectively provided between the air pump 7 and the carbon monoxide remover 43 and between the air pump 7 and the combustor 42. The control unit 6 controls each variable valve V2, V3 based on the electric signal sent from the flow rate sensors S2, S3 which is amplified by the amplifier AMP, and the flow rate of air to be sent to each unit is changed. Each unit of the power generation device is connected by a piping (supply unit), and particularly, the fuel pump 2 and the vaporizer 3 are connected via the after mentioned piping (supply unit) 341.

The electroosmotic flow pump, the piezo pump, the syringe pump or the like can be used as the fuel pump 2. The reaction device 4 and the power generation cell 5 are provided at the downstream side of the vaporizer 3 in order from the upper stream side.

The reaction device 4 comprises the reformer 41 which generates the reformed gas including hydrogen by using the gas mixture of fuel and moisture, the carbon monoxide remover 43 which oxidizes the carbon monoxide which is sequentially generated when the gas mixture is reformed and the combustor 42 which combusts the off gas exhausted from the power generation cell 5. The exhaust gas which is discharged from the combustor 42 is exhausted outside. Here, the combustor 42 is disposed so as to conduct heat to the vaporizer 3, and the combustion heat in the combustor 42 can be used as the heat source of the vaporizer 3. In the reformer 41, the reformed gas including hydrogen is generated by the reaction shown in the chemical reaction formula (1) and also a small amount of carbon monoxide is generated by the reaction shown in the chemical reaction formula (2) by heating the supplied gas mixture of fuel and moisture. In the carbon monoxide remover 43, the reformed gas and air which is sent by the air pump are supplied, and the carbon monoxide is oxidized by the reaction shown in the chemical reaction formula (3) and the fuel gas in which the concentration of carbon monoxide is reduced is generated. The off gas including the remaining hydrogen gas which was not used for the power generation and which is exhausted from the fuel electrode of the power generation cell 5 and air which is sent from the air pump are supplied to the combustor 42, and the off gas is combusted by being heated.

$$CH_3OH + H_2O \rightarrow 3H_2 + CO_2 \quad (1)$$

$$H_2 + CO_2 \rightarrow H_2O + CO \quad (2)$$

$$2CO + O_2 \rightarrow 2CO_2 \quad (3)$$

The power generation cell 5 is configured with an electrolyte film, a fuel electrode and an oxygen electrode formed on both sides of the electrolyte film, an anode output electrode connected to the fuel electrode and a cathode output electrode connected to the oxygen electrode (all are omitted from the drawing) The electricity generated in the power generation cell 5 is taken out by connecting an external load between the anode output electrode and the cathode output electrode. The fuel gas generated in the carbon monoxide remover 43 is humidified by the humidifier (omitted from the drawing) and is supplied to the fuel electrode of the power generation cell 5. The power generation cell 5 separates the supplied fuel gas into hydrogen ion and electrode by the action of catalyst particle (electrochemical reaction formula (4)). The hydrogen ion conducts to the oxygen electrode through the solid polymer electrolyte film, the electron is taken out as electricity via the anode output electrode which is connected to the fuel electrode, and the electron which passed the external load conducts to the oxygen electrode via the cathode output electrode. On the other hand, air which is sent from the air pump 7 is humidified by the other humidifier (omitted from the drawing) and is supplied to the oxygen electrode of the power generation cell 5. Water is generated by the electron moved to the oxygen electrode, the oxygen in air and the hydrogen ion which passed the solid polymer electrolyte film reacting with one another (electrochemical reaction formula (5)).

$$H_2 \rightarrow 2H^+ + 2e^- \quad (4)$$

$$2H^+ + 1/2O_2 + 2e^- \rightarrow H_2O \quad (5)$$

The control unit 6 is configured with the general purpose CPU (Central Processing Unit), the PR (Random Access Memory), the ROM (Read Only Memory) and the like, for example. The fuel pump 2 and the air pump 7 are connected to the control unit 6 via each driver, and the control unit 6 controls the supply and the stoppage of supply of the electricity or the amount of the electricity to be sent out to the fuel pump 2 and air pump 7.

Moreover, the flow rate sensors S1, S2 and S3 are connected to the control unit 6 via each amplifier AMP, and the variable valves V1, V2 and V3 are connected to the control unit 6 via each driver. The control unit 6 detects the flow rate of air, liquid fuel and water by the electric signals sent from the flow rate sensors S1, S2 and S3 which are amplified by the amplifiers AMP, and controls the open/close operation of the variable valves V1, V2 and V3 and adjusts the opening amount of the variable valves V1, V2 and V3 based on the signals.

Further, the heaters (omitted from the drawing) to heat the vaporizer 3, the reformer 41, the combustor 42 and the carbon monoxide remover 43 are respectively connected to the control unit 6 via each driver (omitted from the drawing). The control unit 6 controls the heat release value of the heater by supplying or stopping the supply of electricity to the heater and by controlling the electric current to be supplied. The control unit 6 also detects the temperature of each reactor of the vaporizer 3, the reformer 41, the combustor 42 and the carbon monoxide remover 43 by detecting the resistance value of each heater which varies by the temperature. When the power generation apparatus 100 is activated, the heater heats each of the vaporizer 3, the reformer 41, the combustor 42 and the carbon monoxide remover 43 to an adequate temperature. Thereafter, when the combustor 42 is heated to a predetermined temperature such as 110° C., for example, and when the reformer 41 can be heated stably by carrying out the combustion reaction in the combustor 42, the electric current which is supplied to each heater can be stopped or can be reduced.

[Vaporizer]

Figure 2:
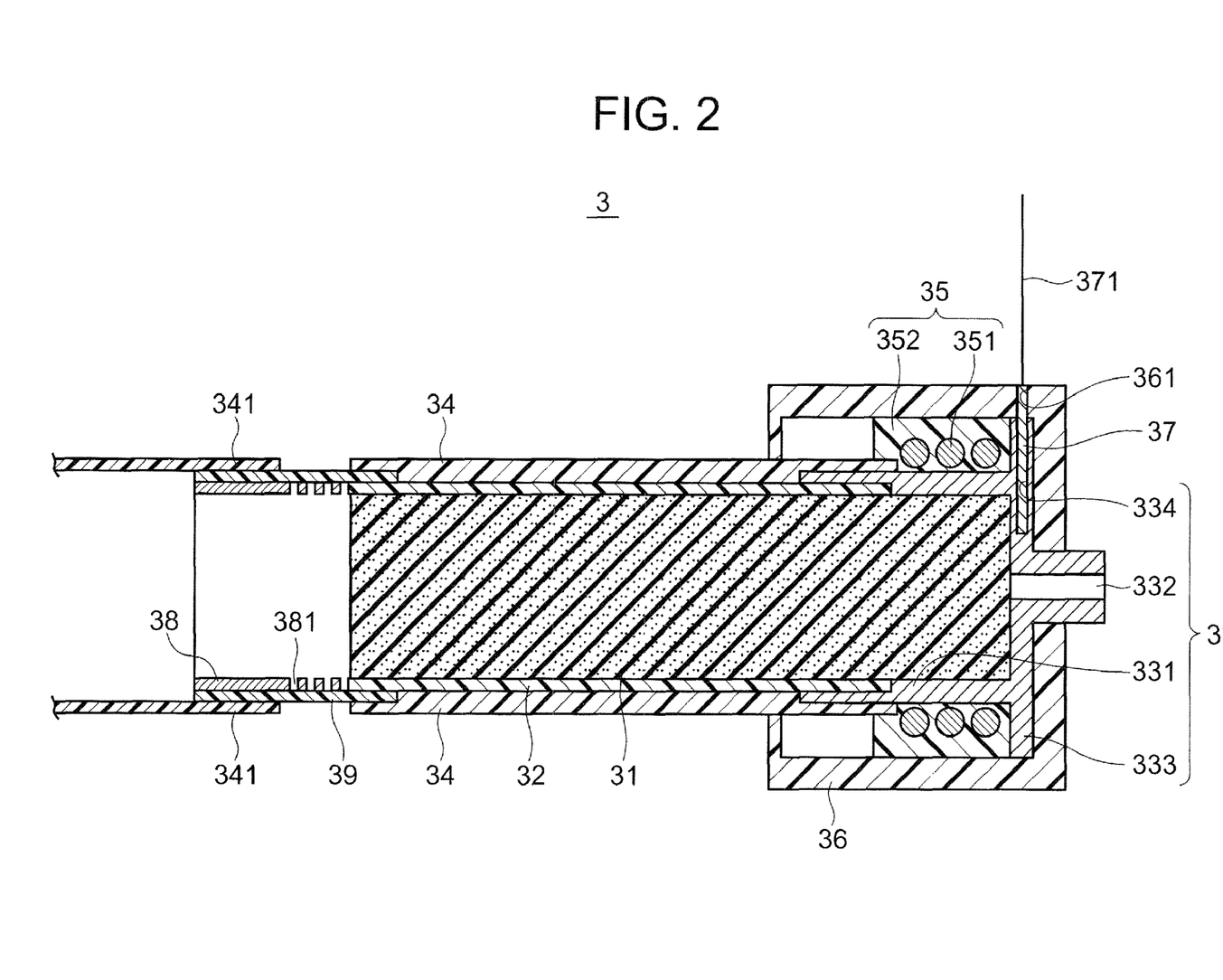
FIG. 2 is a cross sectional view showing an outline structure of the vaporizer 3.
Figure 3:
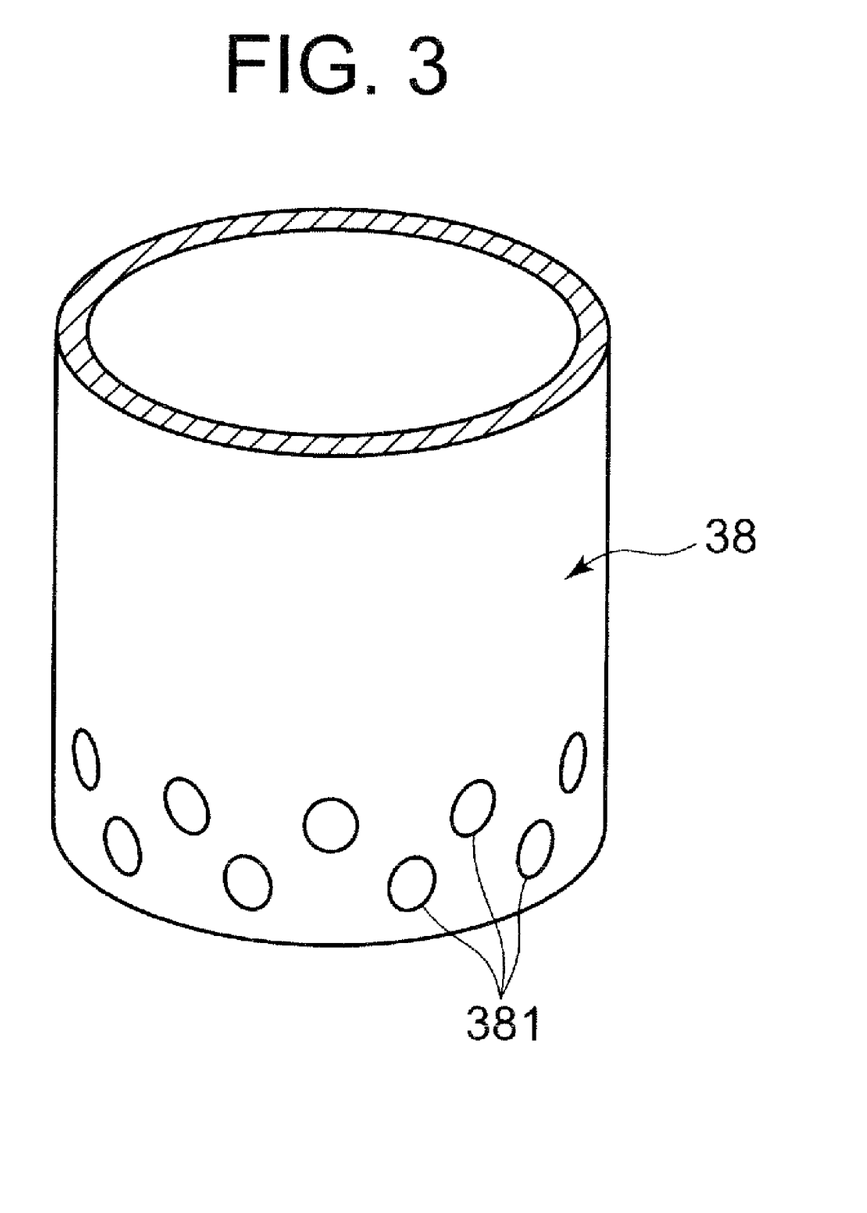
FIG. 3 is a perspective view of the metallic tube 38.

FIG. 2 is a cross sectional diagram showing the outline structure of the vaporizer 3 and FIG. 3 is a perspective view of a metallic pipe 38.

The vaporizer 3 comprises a liquid aspiration unit 31, a contractile tube 32, a discharge unit 33, an elastic tube 34, a heating unit 35, a heat insulation case 36, a temperature sensor 37, a metallic pipe 38 and a gas-liquid separation film 39.

The liquid fuel and water are supplied to the liquid aspiration unit 31 of the vaporizer 3 from the fuel pump 2 via the piping 341. The supplied liquid fuel and water are vaporized by being heated in the liquid aspiration unit 31 by the heat transfer from the heating unit 35. The vaporized liquid fuel and moisture are discharged from the outlet 332 of the discharge unit 33 and are supplied to the reaction device 4 which is connected to the downstream side of the vaporizer 3 via the piping.

For example, the liquid aspiration unit 31 is a core which is formed of a porous material and which is shaped in a rod-like shape such as a cylinder shape, and is inserted in the fitting unit 331 of the discharge unit 33. The liquid aspiration unit 31 intakes the liquid fuel and water which are supplied from the fuel pump 2 via the piping 341, and infiltrates the liquid fuel and water to the outlet 332 side of the discharge unit 33. For example, the porous material can be obtained by solidifying an inorganic fiber such as an acrylic fiber or the like or an organic fiber with a bonding material (for example, an epoxy resin), by sintering an inorganic powder or by solidifying an inorganic powder with a bonding material. Further, a mixture of graphite and glassy carbon, a material which is obtained by binding a plurality of threads constituted of inorganic fiber or organic fiber and solidifying the bundle of threads with a bonding material and the like can be applied as the porous material. Alternatively, a material in which a plurality of types of the above mentioned materials are mixed can be used as the porous material. Because the liquid aspiration unit 31 is constituted of a porous material which aspirates liquid, liquid can be aspirated by the capillary phenomenon and the structure can be simple.

The liquid aspiration unit 31 is fitted inside the contractile tube 32, and the inner circumference surface of the contractile tube 32 and the outside circumference surface of the liquid aspiration unit 31 are adhered to one another. The length of the contractile tube 32 is shorter than the length of the liquid aspiration unit 31, and the downstream end portion (an end portion in the heating tip side) of the liquid aspiration unit 31 is disposed so as to protrude from the downstream end portion of the contractile tube 32. The contractile tube 32 is formed of an unheated material (for example, polyolefin, polyvinylidene fluoride and the like) having heat shrinkability. By inserting the liquid aspiration unit 31 in the unheated contractile tube 32 and then heating the liquid aspiration unit 31 and the contractile tube 32, the contractile tube 32 contracts and the contractile tube 32 and the liquid aspiration unit 31 are adhered with no space between. Here, the liquid aspiration unit 31 is not limited to a cylinder shape, and may be in a prismatic column shape such as a quadratic prism, a hexagonal cylinder or the like.

The heating unit 35 covers the downstream end portion of the fitting unit 331 of the discharge unit 33, and heats the liquid fuel and water which infiltrated in the portion of the liquid aspiration unit 31 which is fitted in the fitting unit 331. The heating unit 35 includes the heater 351 constituted of a heating coil and the heat resisting adhesive agent 352 which covers the heater 351. The heater 351 is provided in a spiral manner so as to encircle the downstream end portion of the fitting unit 331, and is covered by the adhesive agent 352. Here, the heating unit 35 is not limited to the above described structure as long as the portion of the liquid aspiration unit 31 which is fitted in the fitting unit 331 can be heated via the fitting unit 331. Therefore, the heater in a sheet form may be wrapped around the fitting unit 331. The heater 351 of the heating unit 35 is connected to the power source (omitted from the drawing) via the lead wire (omitted from drawing) which is buried in the communication port (omitted from the drawing) formed at the after mentioned heat insulation case 36, and the electricity is provided.

The discharge unit 33 is formed of a metal, for example. Further, the fitting unit 331 in which the liquid aspiration unit 31 is fitted, the outlet 332 which positions at the downstream end portion in continuation to the fitting unit 331 and the frange unit 333 which is protruded from the outer edge of the joint of the fitting unit 331 and the discharge unit 332 are integrally provided. The fitting unit 331 of the discharge unit 33 is in a cylinder shape, and the portion of the downstream end portion of the liquid aspiration unit 31 which is protruded from the contractile tube 32 and the downstream end portion of the contractile tube 32 are fitted to one another and are provided inside the fitting unit 331. The liquid fuel which is infiltrated in the portion of the liquid aspiration unit 31 which is fitted in the fitting unit 331 is heated by the heat of the heating unit 35 which is conducted via the discharge unit 33, and is vaporized and discharged from the outlet 332. The outlet 332 is formed approximately in center of the downstream end surface of the discharge unit 33, and the inner diameter thereof is smaller than the inner diameter of the fitting unit 331. The insertion hole 334 in which the after mentioned temperature sensor 37 is to be inserted is formed along the radial direction at the frange unit 333. Here, the discharge unit 33 may be formed of a material having relatively high heat conductivity other than metal. In such way, the heat of the heating unit 35 can be well conducted to the portion of the liquid aspiration unit 31 which is fitted in the fitting unit 331, and also the heat of the liquid aspiration unit 31 can be well conducted to the temperature sensor 37 which is inserted in the insertion hole 334.

The metallic tube 38 is provided so as to abut the end surface at the upper stream end portion of the contractile tube 32. On the outside circumference surface of the upper stream end portion of the contractile tube 32 and on the outside circumference surface of the metallic tube 38, the after mentioned gas-liquid separation film 39 is provided. As for the metallic tube 38, a metallic tube which is made of metal such as the SUS (stainless steel) can be used, for example. As shown in FIG. 3, the metallic tube 38 is in a circular tube shape, and a plurality of through holes 381 in a circular shape are formed at the downstream end portion of the metallic tube 38. Here, the shape of the through holes 381 is not limited to a circular shape and may be in a rectangle shape or the like.

The gas-liquid separation film 39 is provided so as to adhere on each outside circumference surface from the upper stream end portion of the contractile tube 32 to a portion of the metallic tube 38 at least where the above mentioned through holes 381 are formed, and covers a plurality of through holes 381 which are formed at the metallic tube 38. The gas liquid separation film 39 is a thin film in a cylindrical shape which allows gas to infiltrate but does not allow liquid to infiltrate, and is formed of a cellulose type resin such as polyethylene, polypropylene, polyacrylonitrile, poly-methyl methacrylate, cellulose acetate, cellulose triacetate and the like, a polysulfone type resin such as polyether sulfone, polysulfone and the like, or the like. Gas circulates between inside and outside of the metallic tube 38 via the gas-liquid separation film 39 while liquid does not circulate between inside and outside of the metallic tube 38. Therefore, liquid will not leak outside of the metallic tube.

In the elastic tube 34, the upper stream end portion of the discharge unit 33 is fitted inside thereof at the downstream end portion, the downstream end portion of the gas liquid separation film 39 is fitted inside thereof at the upper stream end portion, and the body portion of the contractile tube 32 is fitted in between. Further, each outside circumference surface of the upper stream end portion of the discharge unit 33, the downstream end portion of the gas-liquid separation film 39 and the body portion of the contractile tube 32 is adhered to the inner circumference surface of the elastic tube 34. Because the upper stream end portion of the elastic tube 34 is not provided at a portion corresponding to the through holes 381 of the metallic tube 38, gas can circulate between inside and outside of the metallic tube 38 via the gas-liquid separation film 39. Furthermore, the piping 341 is connected at the upper stream end portion of the gas-liquid separation film 39, and the piping 341 is joined to the fuel pump 2. The outside circumference surface of the upper stream end portion of the gas liquid separation film 39 and the inner circumference surface of the piping 341 are adhered to one another.

The heat insulation case 36 is formed of resin, for example, and covers the downstream end portion of the elastic tube 34, a portion of the discharge unit 33 excluding the downstream end portion of the outlet 332 and the heating unit 35 in order to maintain the inside temperature. Further, at the heat insulation case 36, the communication port 361 which communicates with the insertion hole 334 of the frange unit 333 and the other communication port in which the lead wire to supply the electricity to the heater 351 is buried are provided.

The temperature sensor 37 is a thermo couple, a thermistor or a resistance-temperature detector, and is buried in the communication port 361 of the heat insulation case 36 and in the insertion hole 334 of the discharge unit 33. The temperature controller (omitted from the drawing) is connected to the temperature sensor 37 via the lead wire 371, and the temperature is detected by the temperature controller. The temperature controller is connected to the power source of the above mentioned heater 351.

When the piezo pump is used as the fuel pump 2, for example, there is a case where the molecule included in the liquid fuel such as ethanol is vaporized or there is a case where bubbles are formed based on the gas including air which is dissolved in the liquid fuel or in water when the pressure is reduced in the vibration portion of the piezo element. On the other hand, when the elecroosmotic flow pump is used, there may be a case where bubbles are formed based on hydrogen and oxygen which are generated by the electrodialysis in the electrode unit in addition. Further, there are a case where bubbles are formed by air entering in the flow passage via the flow passage wall of the piping 341, a case where molecules included in the liquid fuel are vaporized by the pressure inside the piping being temporarily reduced when the valve is opened, and further a case where bubbles are formed based on the gas including air which is dissolved therein even by the liquid fuel or water at the upper stream side of the vaporizer 3 being heater to a temperature exceeding the room temperature.

In such way, when bubbles are formed in the upper stream side of the vaporizer 3, it will be difficult to control the amount of fluid which flows in the vaporizer 3 correctly. Further, when the amount of liquid which flows in the vaporizer 3 becomes unstable, the temperature in the downstream side of the liquid aspiration unit 31 used to be easily unstabled. In such way, it has been difficult to control the amount of gas mixture to be sent to the reformer 41, thus the amount of fuel gas sent to the power generation cell 5 correctly. Especially, because bubbles are difficult to be infiltrated in the porous material comparing to the liquid fuel and water and the bubbles can easily become bigger by the bubbles causing convection at the entrance side of the porous material, and it is more difficult to control the flow rate.

The vaporizer 3 of the embodiment comprises the through holes 381 and the gas-liquid separation film 39 of the metallic tube 38. Therefore, the bubbles formed in the piping 341 at the upper stream side of the vaporizer 3 can be removed from inside of the piping 341 via the through holes 381 and the gas-liquid separation film 39 of the metallic tube 38.

[Operation of Power Generation Device]

Next, the operation of the power generation apparatus 100 will be described.

First, when the operation signal is input to the control unit 6 from the electronic equipment main body 400, the power generation device 100 is activated. At this time, the control unit 6 supplies electricity to the heating unit 35 of the vaporizer 3, and starts the temperature measurement of the liquid aspiration unit 31 by the temperature sensor 37 and controls the electricity supply to the heating unit 35 so that the liquid aspiration unit 31 be at a predetermined temperature. Further, the control unit 6 starts the temperature measurement of each heater of the reformer 41, the combustor 42 and the carbon monoxide remover 43 by supplying electricity to each heater, and controls the electricity supply to each heater so that each reaction unit be at a predetermined temperature.

When the liquid aspiration unit 31 exceeds the predetermined temperature such as 110° C., for example, the control unit 6 supplies electricity to the fuel pump 2 and opens the variable valve V1, and the liquid fuel and water are supplied to the vaporizer 3 from the fuel tank 1 by the fuel pump 2. In this temperature range, the liquid fuel and water supplied to the vaporizer 3 are vaporized, and the gas mixture of fuel and moist is generated and is supplied to the reformer 41. Here, the bubbles formed in the piping 341 at the upper stream side of the vaporizer 3 are removed from inside of the piping 341 via the through holes 381 and the gas-liquid separation film 39 of the metallic tube 38.

In the reformer 41, methanol and moist in the gas mixture which is supplied from the vaporizer 3 react and carbon dioxide and hydrogen are generated, and carbon monoxide is sequentially generated. Then, the gas mixture including hydrogen, carbon dioxide and carbon monoxide which are generated in the reformer 41 is supplied to the carbon monoxide remover 43.

On the other hand, the control unit 6 operates the air pump 7, opens the variable valves V2, V3, and arbitrarily change the amount of air flowing in to the carbon monoxide remover 43 and the combustor 42 by changing the opening degree of the variable valves V2, V3 based on the electric signal sent from the flow rate sensors S1, S2, S3 which are amplified by each amplifier AMP. In the carbon monoxide remover 43, carbon monoxide within the gas mixture which is supplied from the reformer 41 and oxygen within air which is supplied from the air pump 7 selectively react with one another to generate carbon dioxide, and the concentration of carbon monoxide within the gas mixture is reduced to about 10 ppm. In such way, the reformed gas including hydrogen is generated by the vaporizer 3, the reformer 41 and the carbon monoxide remover 43. The reformed gas is humidified by the humidifier and is supplied to the fuel electrode in the power generation cell 5. On the other hand, humidified air is supplied to the power generation cell 5, and electricity is generated by the electrochemical reaction between the reformed gas which is supplied to the fuel electrode and oxygen in air which is supplied to the oxygen electrode, and the generated electricity is supplied to the DC/DC converter 8.

The DC/DC converter 8 converts the electricity which is generated by the power generation cell 5 into an appropriate voltage and supplies to the electronic equipment main body 400 and to the control unit 6. Further, the DC/DC converter 8 charges the electricity which is generated by the power generation cell 5 to the secondary battery 9 and supplies the electricity to the electronic equipment main body 400 from the secondary battery 9 when the power generation cell 5 is stopped. The control unit 6 controls the DC/DC converter 8 and stably supplies electricity to the electronic equipment main body 400. The electronic equipment main body 400 is operated by the electricity supplied from the DC/DC converter 8.

In such way, after the liquid fuel and water are supplied to the power generation unit 200 from the fuel tank 1, electricity is generated and the electronic equipment main body 400 connected to the power generation apparatus 100 is driven by the generated electricity.

Hereinafter, examples in which the vaporizer 3 of the embodiment is used will be described.

Example 1

60 wt % aqueous solution of methanol is supplied to the vaporizer 3 of the embodiment by using a syringe pump in a constant flow of 2.2 ml/h while controlling the heater 351 so that the temperature detected by the temperature sensor 37 is at 160° C. In such case, the bubbles formed at the upper stream side of the liquid aspiration unit 31 contact with the gas-liquid separation film 39 and pass through the gas-liquid separation film 39. In such way, the bubbles are removed and the fuel gas can be supplied stably to the power generation cell 5.

Example 2

This example is same as the fist example described above except for that the elecroosmotic flow pump is used for the pump to send the fuel. The bubbles formed at the upper stream side of the liquid aspiration unit 31 also contact the gas-liquid separation film 39 and can also pass through the gas-liquid separation film 39 in this example. Therefore, the bubbles can be removed and the fuel gas can be supplied stably to the power generation cell 5.

Example 3

This example is same as the Examples 1 and 2 which are described above except for that the piezo pump is used for the pump to send the fuel. The bubbles formed at the upper stream side of the liquid aspiration unit 31 also contact the gas-liquid separation film 39 and can also pass through the gas-liquid separation film 39 in this example. Therefore, the bubbles can be removed and the fuel gas can be supplied stably to the power generation cell 5.

As described above, because the through holes 381 and the gas-liquid separation film 39 of the metallic tube 38 are provided at the upper stream side of the liquid aspiration unit 31, the vaporizer 3 of the embodiment can remove the bubbles formed in the liquid fuel and water which are supplied from the fuel tank 1 and which are sent through the piping 341 at the upper stream side of the liquid aspiration unit 31. In such way, the amount of the gas mixture generated in the vaporizer 3 which is to be sent to the downstream side can be controlled correctly. Therefore, the amount of the gas mixture to be supplied to the reformer 41, thus the amount of the fuel gas sent to the power generation cell 5 can be controlled stably.

Second Embodiment

Figure 4:
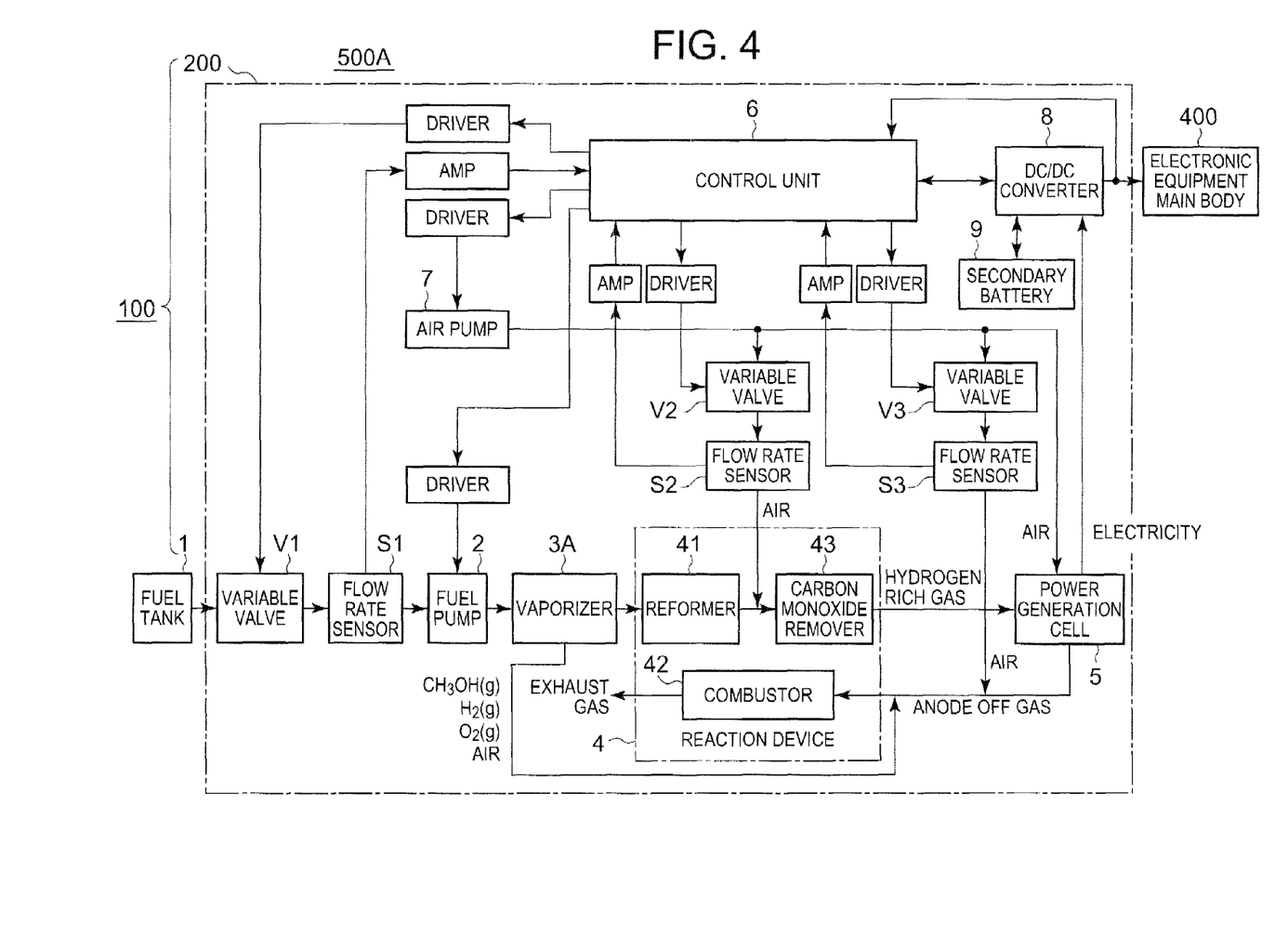
FIG. 4 is a block diagram showing a basic structure of the electronic equipment 500A according to the second embodiment.
Figure 5:
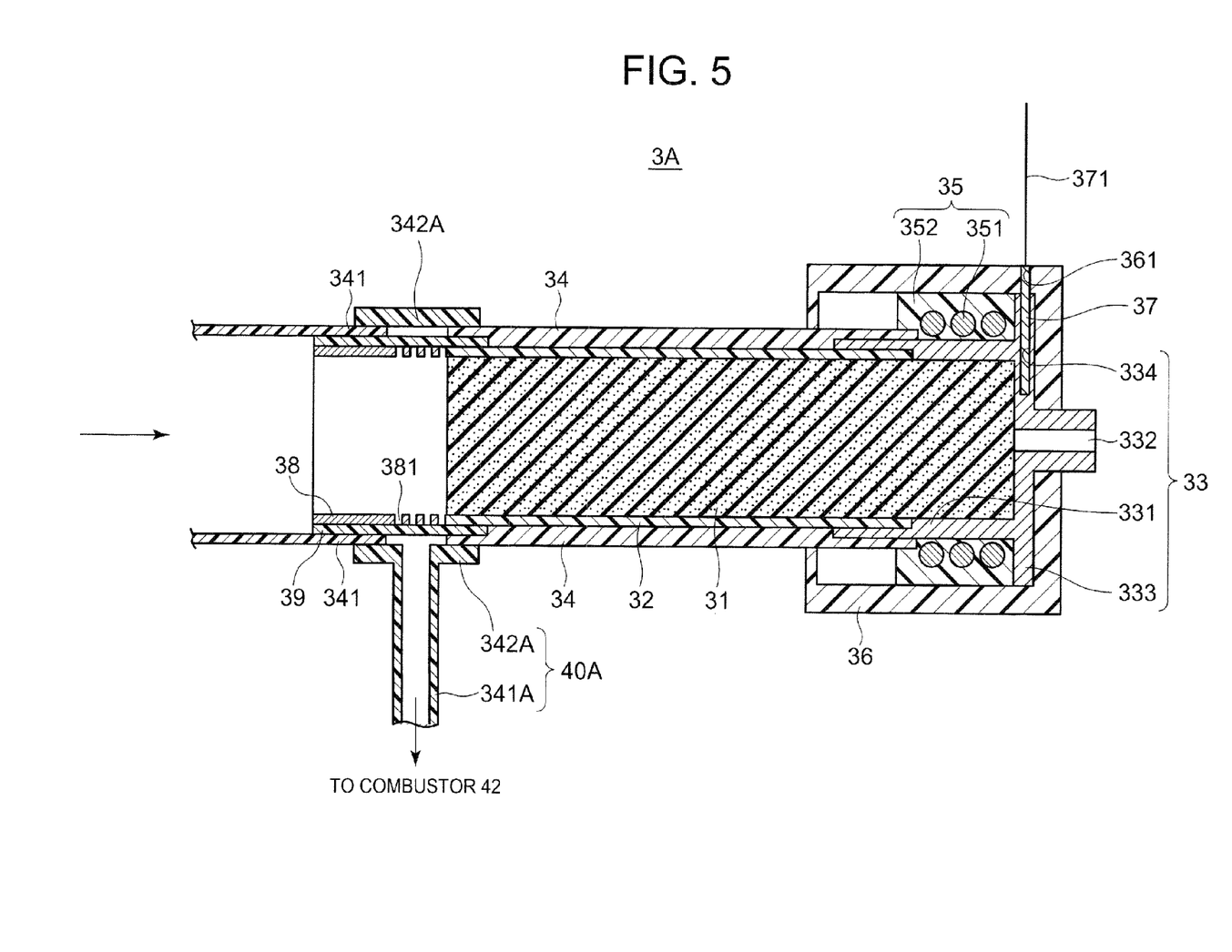
FIG. 5 is a cross sectional diagram showing an outline structure of the vaporizer 3A.

FIG. 4 is a block diagram showing a basic structure of the electronic equipment 500A according to the second embodiment and FIG. 5 is a cross sectional diagram showing an outline structure of the vaporizer 3A.

In the embodiment, the connector tube (gas piping) 40A is attached so as to cover the gas-liquid separation film 39 which is exposed outside from the upper stream end portion of the elastic tube 34A to the downstream end portion of the piping 341. The embodiment differs from the vaporizer 3 of the first embodiment in a point that one end portion of the connector tube 40A is connected to the upper stream side of the combustor 42. The other structures are same as the first embodiment. Therefore, the same reference numerals are used for the same structural parts and the descriptions are omitted.

The connector tube 40A is constituted of the body portion 342A which covers the portion of the gas-liquid separation film 39 which is exposed outside and the pipe portion 341A in which the hollow inside space thereof communicates with the space in the body portion 342A at one end portion, and the other end portion of the pipe portion 341A is connected to the upper stream side of the combustor 42.

As described above, in the embodiment, the gas which includes any one of vaporized ethanol, hydrogen and oxygen that passed through the gas liquid separation film 39 is supplied to the upper stream side of the combustor 42 via the connector tube 40A because the other end portion of the pipe portion 341A is connected to the upper stream side of the combustor 42. In such way, the product such as ethanol and hydrogen can be sent to the combustor 42 without being released in the atmosphere and the gas can be processed safely by being combusted in the combustor 42. Further, hydrogen which is generated at the upper stream side of the vaporizer 3 can be effectively used as the combusting heat. In addition, similarly to the above described first embodiment, the amount of the gas mixture which is generated in the vaporizer 3 and which is to be sent to the downstream side can be controlled correctly. Therefore, the amount of the gas mixture to be supplied to the reformer 41, thus the amount of the fuel gas sent to the power generation cell 5 can be controlled stably.

Modification Example

Hereinafter, a modification example of the above described second embodiment will be described.

Figure 6:
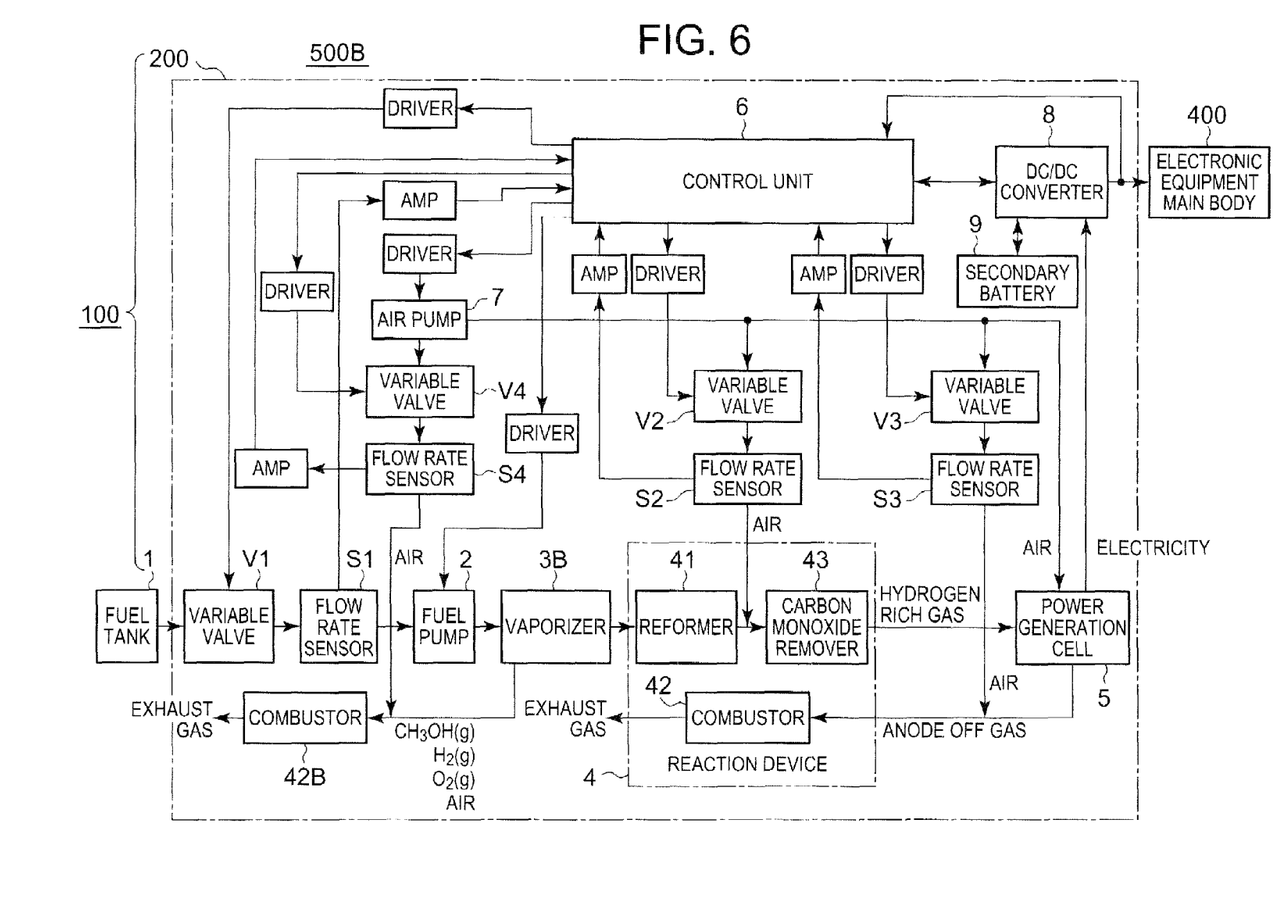
FIG. 6 is a block diagram showing a basic structure of the electronic equipment 500B according to a modification example.

FIG. 6 is a block diagram showing a basic structure of the electronic equipment 500B according to the modification example. The modification example differs from the vaporizer 3 of the second embodiment in that one end portion of the above mentioned connector tube 40A is connected to the other combustor 42B which is different from the combustor 42 and that air is sent to the upper stream side of the combustor 42B from the air pump 7 via the variable valve V4 and the flow rate sensor S4. The other structures are same as the first and the second embodiments. Therefore, the same reference numerals are used for the same structural parts and the descriptions are omitted. Here, the control unit 6 and the flow rate sensor S4 are connected via the amplifier AMP which amplifies the electric signal sent from the flow rate sensor S4, and the control unit 6 and the variable valve V4 are connected via a driver.

In the modification example, the other end portion of the pipe portion 341A is also connected to the other combustor 42B which is different from the combustor 42. Therefore, the gas including any one of the vaporized ethanol, hydrogen and oxygen which passed through the gas liquid separation film 39 can be sent to the combustor 42B without being released in the atmosphere and the gas can be processed safely by being combusted in the combustor 42. Further, similarly to the above described first and second embodiments, the amount of the gas mixture which is generated in the vaporizer 3 and which is to be sent to the downstream side can be controlled more correctly. Therefore, the amount of the gas mixture to be supplied to the reformer 41, thus the amount of the fuel gas sent to the power generation cell 5 can be control stably.

The vaporizer of the present invention is not limited to the above described embodiments. It is needless to say that the vaporizer of the present invention can be applied in a case where a plurality of vaporizers which respectively vaporize fuel and water are provided.

What is claimed is:

1. A vaporizer, comprising:
   a gas-liquid separation film which separates a gas which is included in a supplied liquid and which allows the gas which is separated to pass through the gas-liquid separation film; and
   a heating unit which is provided at a downstream side of the gas-liquid separation film and which heats the liquid.

2. The vaporizer according to claim 1, further comprising a liquid aspiration unit which includes a porous material to aspirate the liquid, wherein the liquid aspiration unit is provided at the downstream side of the gas-liquid separation film.

3. The vaporizer according to claim 2, wherein the heating unit heats a downstream end portion of the liquid aspiration unit.

4. The vaporizer according to claim 1, further comprising a gas piping to collect the gas which passes through the gas-liquid separation film.

5. The vaporizer according to claim 4, wherein the gas piping sends the gas which passed through the gas-liquid separation film to a combustor which combusts the gas.

6. The vaporizer according to claim 1, wherein the gas which passes through the gas-liquid separation film includes a gas which is generated by a supply unit which supplies the liquid to the heating unit.

7. The vaporizer according to claim 6, wherein the supply unit includes any one of an elecroosmotic flow pump, a piezo pump, and a syringe pump.

8. The vaporizer according to claim 1, wherein the liquid includes at least one of a fuel and water.

9. The vaporizer according to claim 1, wherein the gas includes any one of a methanol gas, a hydrogen gas, an oxygen gas, and air.

10. A power generation apparatus, comprising:
    a vaporizer to vaporize a supplied liquid;
    a reaction device to generate a reformed gas by a reaction of a gas which is generated by the vaporizer;
    a power generation cell to generate electricity by a reaction of the reformed gas,
    wherein the vaporizer includes a gas-liquid separation film which separates a gas which is included in the supplied liquid and which allows the gas which is separated to pass through the gas-liquid separation film, and a heating unit which is provided at a downstream side of the gas-liquid separation film and which heats the liquid fuel.

11. The power generation apparatus according to claim 10, wherein the vaporizer further comprises a liquid aspiration unit comprising a porous material which aspirates the liquid, wherein the liquid aspiration unit is provided at the downstream side of the gas-liquid separation film.

12. The power generation apparatus according to claim 11, wherein the heating unit heats a downstream end portion of the liquid aspiration unit.

13. The power generation apparatus according to claim 10, wherein the vaporizer further comprises a gas piping to collect the gas which passed through the gas-liquid separation film.

14. The power generation apparatus according to claim 10, further comprising a combustor to combust the gas which passed through the gas-liquid separation film.

15. The power generation apparatus according to claim 14, wherein the combustor combusts an off gas of the power generation cell.

16. The power generation apparatus according to claim 10, further comprising a supply unit to send the liquid to an upper stream side of the gas-liquid separation film.

17. The power generation apparatus according to claim 16, wherein the gas which passes through the gas-liquid separation film includes a gas which is generated by the supply unit.

18. The power generation apparatus according to claim 17, wherein the supply unit includes any one of an elecroosmotic flow pump, a piezo pump, and a syringe pump.

19. The power generation apparatus according to claim 10, wherein the liquid includes at least one of a fuel and water.

20. The power generation apparatus according to claim 10, wherein the gas includes any one of a methanol gas, a hydrogen gas, an oxygen gas, and air.

21. An electronic equipment, comprising:
    the power generation apparatus of claim 10; and
    an electronic equipment main body which operates by electricity which is generated by the power generation apparatus.

* * * * *